US012651759B2

(12) United States Patent
Blomgren et al.

(10) Patent No.: US 12,651,759 B2
(45) Date of Patent: Jun. 9, 2026

(54) METHOD FOR DETERMINING AGING OF A FUEL CELL SYSTEM

(71) Applicant: Volvo Truck Corporation, Gothenburg (SE)

(72) Inventors: Fredrik Blomgren, Hisings Kärra (SE); Johan Lindberg, Gothenburg (SE); Staffan Luong, Mölndahl (SE)

(73) Assignee: Volvo Truck Corporation, Gothenburg (SE)

( * ) Notice: Subject to any disclaimer, the term of this patent is extended or adjusted under 35 U.S.C. 154(b) by 648 days.

(21) Appl. No.: 18/104,354

(22) Filed: Feb. 1, 2023

(65) Prior Publication Data

US 2023/0253585 A1 Aug. 10, 2023

(30) Foreign Application Priority Data

Feb. 9, 2022 (EP) ..................................... 22155905

(51) Int. Cl.
*H01M 8/04664* (2016.01)
*B60L 3/00* (2019.01)
*H01M 8/04992* (2016.01)

(52) U.S. Cl.
CPC ....... *H01M 8/04679* (2013.01); *B60L 3/0053* (2013.01); *H01M 8/04992* (2013.01); *B60L 2260/50* (2013.01)

(58) Field of Classification Search
CPC .............. H01M 2250/20; B60L 3/0053; B60L 2260/50; B60L 3/12; B60L 50/72; B60L 50/75; B60L 58/30; B60L 58/40; B60L 2200/18; B60L 2200/36; B60L 2200/40; B60L 2240/26; B60L 2240/62; B60L 2240/64; B60L 2240/66; B60L 2240/68; B60L 2240/80; B60L 2260/44; B60L 2260/46; B60L 50/71; Y02E 60/50;
(Continued)

(56) References Cited

U.S. PATENT DOCUMENTS

2010/0026307 A1* 2/2010 Farnsworth ....... H01M 8/04992
324/426
2019/0018067 A1 1/2019 Kong et al.
(Continued)

FOREIGN PATENT DOCUMENTS

CN 109683093 A 4/2019
DE 102015225353 A1 6/2017
DE 102015225354 A1 6/2017

OTHER PUBLICATIONS

Mueller et al., DE 102015225354, Espacenet machine translation, 2015 (Year: 2015).*
(Continued)

*Primary Examiner* — Adam A Arciero
(74) *Attorney, Agent, or Firm* — Withrow & Terranova, PLLC

(57) ABSTRACT
A method for determining aging of a fuel cell system for a vehicle, comprising identifying a future interval in terms of time or distance during which the fuel cell system is expected to operate at stationary operating conditions, obtaining measurement values pertaining to at least one fuel cell parameter indicative of degradation of the fuel cell system during the identified interval, and determining an aging state of the fuel cell system using the measurement values.

16 Claims, 3 Drawing Sheets

(58) Field of Classification Search
CPC .. Y02T 90/40; G01R 31/388; G01R 31/3648;
G01R 31/389; G01R 31/392
See application file for complete search history.

(56) References Cited

U.S. PATENT DOCUMENTS

2021/0270622 A1      9/2021   Vallur Rajendran et al.
2022/0306128 A1*    9/2022   Farnsworth ....... H01M 8/04768

OTHER PUBLICATIONS

Extended European Search Report for European Patent Application
No. 22155905.7, mailed Aug. 3, 2022, 18 pages.

\* cited by examiner

METHOD FOR DETERMINING AGING OF A FUEL CELL SYSTEM

RELATED APPLICATIONS

The present application claims priority to European Patent Application No. 22155905.7, filed on Feb. 9, 2022, and entitled "METHOD FOR DETERMINING AGING OF A FUEL CELL SYSTEM," which is incorporated herein by reference in its entirety.

TECHNICAL FIELD

The invention relates to a method for determining aging of a fuel cell system for a vehicle, and for controlling power split between a fuel cell system and an electrical energy storage unit. It further relates to a computer program, a computer readable medium, a control unit, and a vehicle.

The invention can be applied in heavy-duty vehicles, such as trucks, buses and construction equipment. Although the invention will be described with respect to a truck, the invention is not restricted to this particular vehicle, but may also be used in other vehicles such as passenger cars.

BACKGROUND

A fuel cell system can be used as an alternative or as a complement to electric batteries. In recent years fuel cell systems have been considered for powering electric vehicles. Typically, a fuel cell system may for this purpose be used together with an electrical energy storage unit, such as a battery, for powering the fuel cell electric vehicle. In this case, propulsion power may be provided by one or both of the fuel cell system and the battery in accordance with a power demand for driving the vehicle. Excess power generated by the fuel cell system, and power generated by, e.g., regenerative braking, may thus be stored in the battery to reduce fuel consumption and improve energy efficiency. A power split between the fuel cell system and the battery may be controlled in accordance with a control strategy so as to, e.g., minimize fuel consumption. To be able to accurately control the power split, it is crucial to be aware of the efficiency of the fuel cell system and the battery, respectively.

A problem arising in fuel cell electric vehicles is associated to the aging, i.e., degradation, of the fuel cell system arising over time. The aging reduces the fuel cell efficiency and thereby leads to a direct increase in fuel consumption. Furthermore, a secondary effect arises in the form of an increased cooling demand and thereby an increased power request of a cooling fan of the fuel cell system. The reduced efficiency of the fuel cell system may furthermore cause a non-optimal power split between the battery and the fuel cell system, since the power split strategy may be determined for a non-aged fuel cell system.

Therefore, there is a strive to develop alternative and/or improved fuel cell related technology which takes at least some of the above concerns into account.

SUMMARY

An object of the invention is to provide a method for determining fuel cell aging, which provides an alternative and/or an improvement in relation to known methods of determining aging of a fuel cell system. In particular, it is an object to provide such a method that may be applied during operation of a vehicle powered by the fuel cell system.

Another object of the invention is to provide an in at least some aspect improved method for controlling power split between a fuel cell system and an electrical energy storage unit. Yet further objects of the invention are to provide a computer program, a computer readable medium, a control unit, and a vehicle.

According to a first aspect of the invention, at least one of the objects is achieved by a method according to claim 1. The method can be computer implemented and be carried out by at least one processor device of a computer system, or control system.

Thus, a method for determining aging of a fuel cell system for a vehicle is provided. The method comprises:

during operation of the vehicle, identifying a future interval in terms of time or distance, during which interval the fuel cell system is expected to operate at stationary operating conditions, obtaining measurement values pertaining to at least one fuel cell parameter indicative of degradation of the fuel cell system during the identified interval, determining an aging state of the fuel cell system using said measurement values.

By identifying a future time interval or distance interval during which the fuel cell system is expected to operate at stationary operating conditions, it is possible to predict conditions that are suitable for determining degradation of the fuel cell system. Fuel cell parameters that may be used for characterizing fuel cell aging include current, voltage, power, impedance, and efficiency. Regardless of which fuel cell parameter(s) is/are used for the characterisation, stationary operating conditions of the fuel cell system are necessary during the measurement thereof. The inventors of the present invention have realised that, by identifying an upcoming road or time segment during which stationary conditions are expected, it is possible to determine aging of the fuel cell system during operation of the vehicle, i.e., during driving of the vehicle. Thereby, a degradation model of the fuel cell system can be updated and power split between the fuel cell system and an electrical energy storage unit may be controlled in accordance with an actual aging state of the fuel cell system. Fuel consumption and energy efficiency may thereby be reduced. Furthermore, uptime of the vehicle may be improved since it will not be necessary to perform measurements to determine aging during service of the vehicle.

By stationary operating conditions are herein intended fuel cell operating conditions in terms of pressure, mass flow, fuel cell membrane water content, etc., that are constant or that do not deviate from constant values by more than predetermined amounts, such as by 7%, or 5%, or 3%.

Obtaining measurement values pertaining to at least one fuel cell parameter may comprise measuring the at least one fuel cell parameter. It may also comprise receiving measurement values communicated to a control unit in which the method is performed, wherein the control unit receiving the measurement values may optionally be an off-board control unit located outside the vehicle. In this case, the measurement may be initiated by sending a control signal from the control unit to one or more devices configured to collect measurement values. In this way, the actual determination of the aging may be performed off-board the vehicle by the off-board control unit and communicated to an on-board control unit, thus reducing the need for on-board computational power.

In some embodiments, the step of determining an aging state of the fuel cell system using the measurement values may be performed in connection with a service of the vehicle. In those cases, the steps of identifying the future time interval and obtaining measurement values are performed during travel, and the step of determining the aging state is performed separately. However, all steps may also be performed during travel, either on-board or off-board the vehicle.

Optionally, the future interval is an interval during which the fuel cell system is expected to be operated or possible to operate at a constant or nearly constant operating power. During such an interval, stationary fuel cell operating conditions are enabled. An interval during which the fuel cell system is possible to operate at a constant operating power is herein to be understood as an interval in terms of time distance travelled, during which interval the fuel cell system can be operated at constant power without disrupting a transport mission, meaning that no loss of power will be experienced by an operator of the vehicle. By a nearly constant operating power is herein intended an operating power that does not differ from a constant value by more than 7%, or 5%, or 3%.

Optionally, the constant operating power is within a linear power range of the fuel cell system. The linear power range is a power range in which a polarization curve of the fuel cell system, describing polarization cell voltage as a function of current, is linear, and/or in which a curve describing the fuel cell efficiency as a function of power is linear.

Optionally, the method further comprises determining a reliability of the determined aging state, wherein the reliability is determined in dependence on at least a number of measurement occasions in each one of a predetermined low power operating range, a predetermined medium power operating range, and a predetermined high power operating range of the fuel cell system. The number of measurement occasions is herein the number of occasions at which the measurement of at least one fuel cell parameter indicative of degradation of the fuel cell system during an identified interval has been performed. The low, medium and high operating power ranges should preferably be within the linear power range of the fuel cell system so that three measurement occasions, one in each operating power range, yield three points on an assumed straight line. A relatively high reliability can thereby be determined when measurements in all three power operating ranges have been performed within a predetermined time range or travel range of the vehicle, while as a lower reliability can be determined when it has only been possible to perform measurements in one or two of the three power operating ranges.

Determining the reliability may further comprise determining an actual duration of the identified interval during which measurement values were collected during a measurement occasion, wherein a reliability value of the measurement occasion is determined in dependence on the actual duration with respect to an expected duration of the identified interval. In other words, a point on a polarization curve or efficiency curve yielded by the measurement is weighted in dependence on the ratio of the actual duration and the expected duration. For example, when the actual duration coincides with the expected duration, the point may be set to be highly reliable, such as 100% reliable, while as when the actual duration amounts to 50% of the expected duration, the point may be set to be 50% reliable.

Optionally, identifying the future interval comprises predicting an operating power of the fuel cell system during a prediction horizon, which may be set in terms of time or distance. The operating power may be understood as a power request for power delivery from the fuel cell system.

Optionally, predicting the operating power comprises:

receiving vehicle related information comprising at least one of traffic information for an expected travelling route of the vehicle during the prediction horizon, terrain information for the expected travelling route during the prediction horizon, topographic information for the expected travelling route during the prediction horizon, weather information for the expected travelling route during the prediction horizon, and vehicle gross weight information during the prediction horizon, using said received vehicle related information for predicting the operating power during the prediction horizon.

One or more of the above vehicle related pieces of information may result in that the operating power over the prediction horizon is predicted in an appropriate manner.

In some cases, the fuel cell system is electrically connected to an electrical energy storage unit, wherein predicting the operating power may further comprise:

receiving battery information indicative of at least one of a current state-of-charge and an expected energy capacity of the electrical energy storage unit during the prediction horizon, using the received battery information for predicting the operating power during the prediction horizon.

The battery information may for instance provide information indicative of whether or not it is possible to operate the fuel cell system to charge the electrical energy storage unit. The actual operation of the fuel cell system during the prediction horizon may be dependent on whether or not the electrical energy storage unit can be charged. As such, information as regards the electrical energy storage unit may be used in order to adequately predict the fuel cell operating power.

Optionally, identifying the future interval comprises using machine learning based on historical data relating to an operating power of the fuel cell system. This is particularly useful for identifying possible occasions with stationary fuel cell operating conditions for a vehicle which repeatedly travels the same route. Machine learning based on historical data may accurately reveal plausible occasions at which a constant or nearly constant operating power is expected.

Optionally, the historical data comprises data indicative of the operating power of the fuel cell system as a function of at least geographical location of the vehicle and/or time, such as time of day, time of year, and/or day of week. By using data collected at similar location and/or time, an accurate identification of the future interval is possible.

Optionally, identifying the future interval comprises determining an expected travelling route of the vehicle, wherein the historical data comprise data indicative of the operating power of the fuel cell system at one or more previous occasions of travelling along the expected travelling route. The expected travelling route may thus be a known travelling route.

Optionally, the future interval has a duration or length corresponding to at least two minutes, preferably at least five minutes, more preferably at least ten minutes. If the interval is defined in terms of distance, it thus has a length that with an expected travelling speed results in the mentioned duration. With such a duration, it is ensured that there is sufficient time for the fuel cell operating conditions to stabilize and carry out the required measurements for determining aging.

Optionally, the method further comprises:

detecting actual operating conditions and/or an actual operating power of the fuel cell system during the identified interval, wherein the determination of the aging state of the fuel cell system using said measured at least one fuel cell parameter is only carried out when the actual operating conditions and/or the actual operating power fulfill(s) at least one predetermined stability criterion. Such a stability criterion may for example be considered to be fulfilled when the operating power is within a predefined tolerance range for at least a predetermined time. By defining a stability criterion, it is ensured that a reliable determination of aging can be carried out.

Optionally, determining the aging state comprises inputting said measured at least one fuel cell parameter to a degradation model describing the aging state of the fuel cell system. The measured fuel cell parameter(s) may be used for augmentation of the degradation model. Thus, the degradation model may be updated on each occasion that the fuel cell system is operated at stationary operating conditions for a sufficient period of time to carry out the required measurements. This reduces the risk of misjudging the aging state of the fuel cell system. The aging model may, by way of example, be based on one or more of fuel cell efficiency, polarization curves, and/or impedance spectra.

According to a second aspect of the invention, a method for controlling power split between a fuel cell system and an electrical energy storage unit to which the fuel cell system is electrically connected is provided. The method comprises:

determining an aging state of the fuel cell system using the method according to the first aspect, controlling the power split between the fuel cell system and the electrical energy storage unit in dependence on the determined aging state of the fuel cell system.

The aging state of the fuel cell system largely determines the efficiency thereof. By controlling the power split in dependence on the aging state of the fuel cell system, it is therefore possible to adjust the power split over time so as to improve the overall energy efficiency of the combined power system of the vehicle, including the fuel cell system and the electrical energy storage unit.

According to a third aspect of the invention, a computer program comprising program code means for performing the method of the first and/or the second aspect when said computer program is run on a computer, such as a control unit, is provided.

According to a fourth aspect of the invention, a computer readable medium carrying a computer program comprising program code means for performing the method of the first and/or the second aspect when said computer program is run on a computer, such as control unit, is provided.

According to a fifth aspect of the invention, a control unit configured to perform the method according to the first and/or the second aspect is provided. The control unit may be an electronic control unit provided on-board a vehicle comprising a fuel cell system, or remotely located from the vehicle. The control unit may comprise means for measuring the at least one fuel cell parameter, and/or it may be configured to communicate with such measuring means to initiate measurements and receive measurement values.

Advantages and effects of the fifth aspect are largely analogous to the advantages and effects of the first and second aspects of the invention. Furthermore, all embodiments of the fifth aspect of the invention are combinable with all embodiments of the first and second aspects of the invention, and vice versa.

According to a sixth aspect of the invention, a vehicle is provided. The vehicle comprises a fuel cell system adapted to deliver power contributing to the propulsion of the vehicle and the control unit according to the fifth aspect. The vehicle may further comprise an electrical energy storage unit to which the fuel cell system is electrically connected or connectable.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

With reference to the appended drawings, below follows a more detailed description of embodiments of the invention cited as examples.

Figure 1:
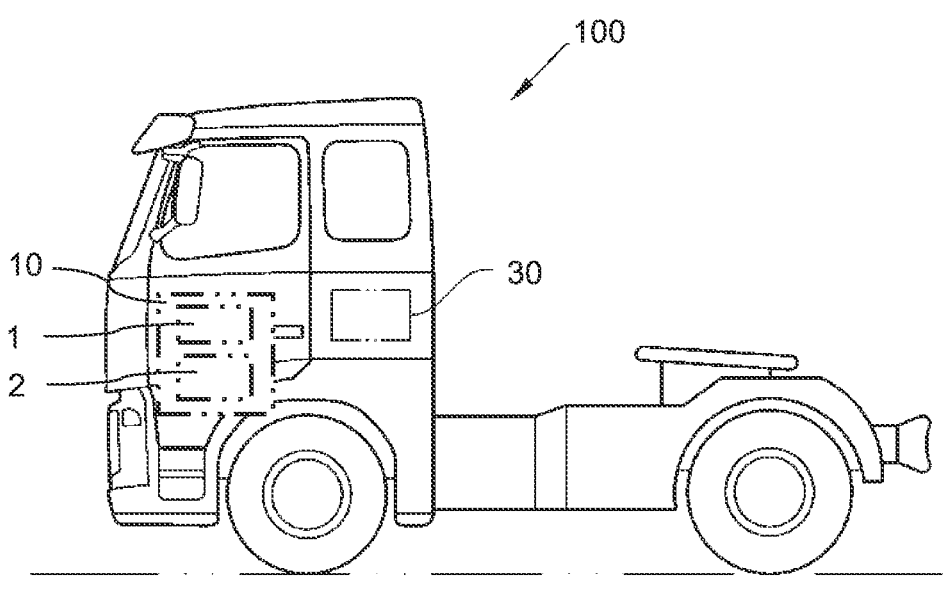
FIG. 1 is a schematic side view of a vehicle.

FIG. 1 depicts a side view of a vehicle 100 according to an example embodiment of the invention. The vehicle 100 is here a truck, more specifically a heavy-duty truck for towing one or more trailers (not shown). Even though a heavy-duty truck 100 is shown it shall be noted that the invention is not limited to this type of vehicle but may be used for any other type of vehicle, such as a bus, construction equipment, e.g., a wheel loader and an excavator, and a passenger car.

The vehicle 100 comprises a power system 10. The power system 10 is here used for powering one or more electric motors (not shown) which are used for creating a propulsion force to the vehicle 100. The power system 10 may additionally or alternatively be used for powering other electric power consumers of the vehicle 100, such as an electric motor for a refrigerator system, an electric motor for an air conditioning system, or any other electric power consuming function of the vehicle 100. The power system 10 comprises a fuel cell system 1 according to an example embodiment of the invention. It further comprises an electrical energy storage unit 2, to which the fuel cell system 1 is electrically connected so that power generated by the fuel cell system 1 can be stored in the electrical energy storage unit 2. The electrical energy storage unit 2 may comprise one or more batteries, such as one or more Li-ion batteries. The power system 10 may further comprise power electronics (not shown) for converting electric energy as necessary within the power system 10 of the vehicle. Such power electronics may e.g. include a DC/DC converter.

The vehicle 100 further comprises a control unit 30 according to an example embodiment of the invention. The control unit 30 is thus configured for determining aging of the fuel cell system 1 and for controlling power split between the fuel cell system 1 and the electrical energy storage unit 2. Even though an on-board control unit 30 is shown, it shall be understood that the control unit could also be a remote control unit 30, i.e. an off-board control unit, or a combination of an on-board and off-board control unit. The control unit 30 may be configured to control the fuel cell system 1 by issuing control signals and by receiving status information relating to the fuel cell system 1.

The control unit 30 is an electronic control unit and may comprise processing circuitry which is adapted to run a computer program as disclosed herein. The control unit 30 may comprise hardware and/or software for performing the method according to the invention. In an embodiment the control unit 30 may be denoted a computer. The control unit 30 may be constituted by one or more separate sub-units. For example, the determination of aging and the control of the power split may be performed by different sub-units. In addition, the control unit 30 may communicate by use of wired and/or wireless communication means.

The fuel cell system 1 comprises one or more fuel cells (not shown), typically several fuel cells. The fuel cells may also be denoted as a fuel cell stack, wherein the fuel cell stack may comprise several hundreds of fuel cells. Further, the fuel cell system 1 is arranged to provide the fuel cells with necessary supply of air and fuel, such as hydrogen. Further, in addition or alternative to what is mentioned in the above, the fuel cell system 1 may comprise various components such as compressors, sensors, pumps, valves and electrical components.

Figure 2:
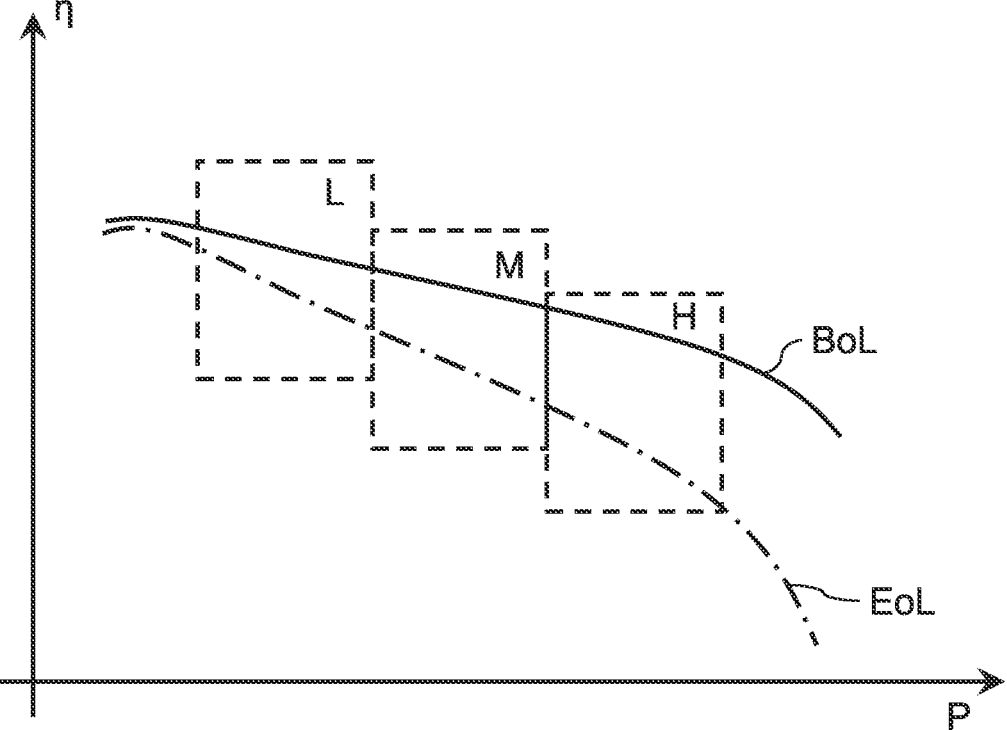
FIG. 2 is a diagram illustrating fuel cell efficiency as a function of operating power.

Fuel cell efficiency $\eta$ as a function of fuel cell operating power P is schematically shown in FIG. 2 for a fuel cell system at the beginning of life (BoL, solid line) and an aged fuel cell system at the end of life (EoL, dash-dot line), respectively. As illustrated, the fuel cell efficiency 11 reduces over time due to degradation of the fuel cells. It can also be seen in FIG. 2 that the fuel cell efficiency 11 as a function of power P is linear or approximately linear in a power range defined by a low power operating range L, a medium power operating range M, and a high power operating range H, regardless of the aging state of the fuel cell system 1.

Figure 3:
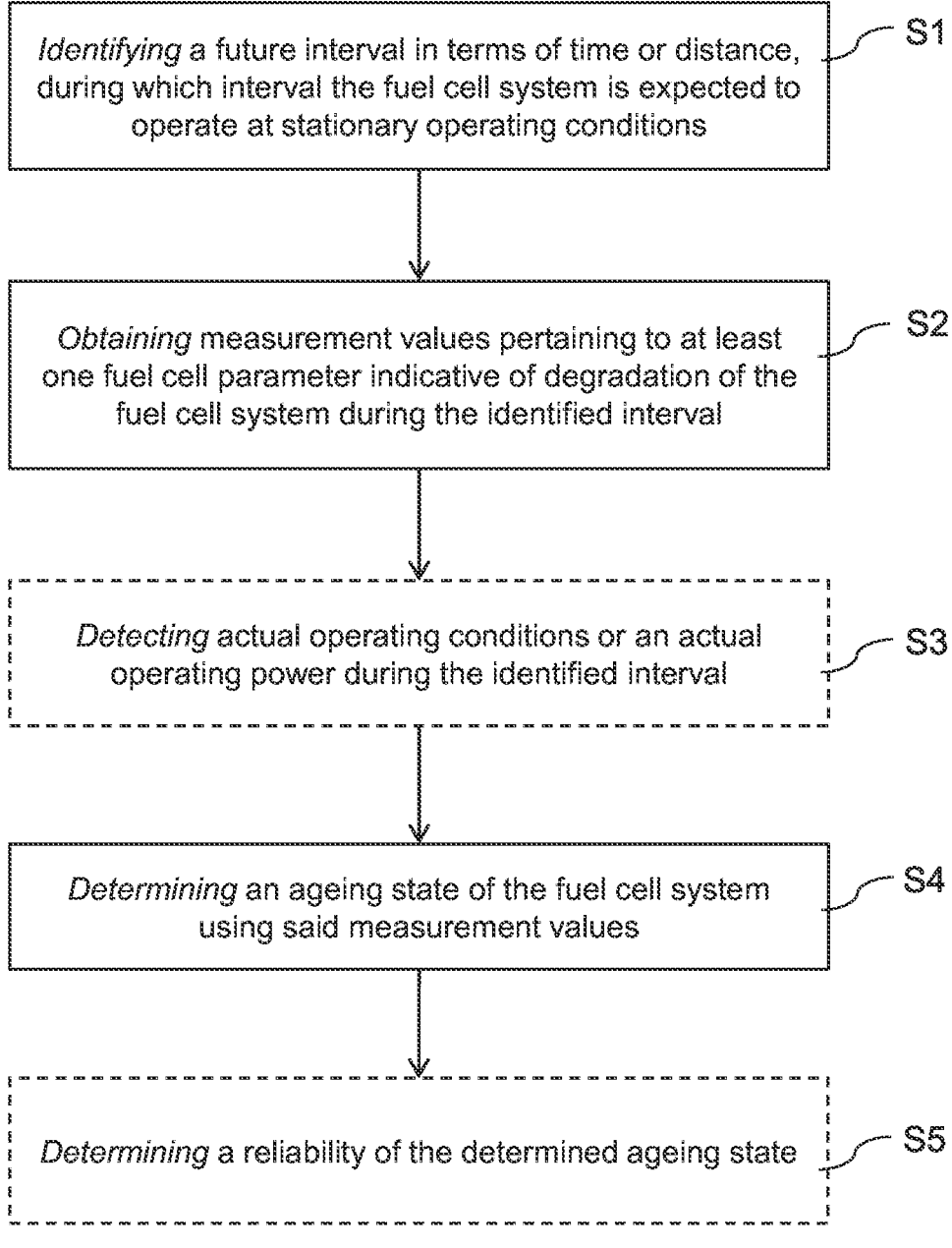
FIG. 3 is a flow chart illustrating an embodiment of a method for determining aging of a fuel cell system.
Figure 4:
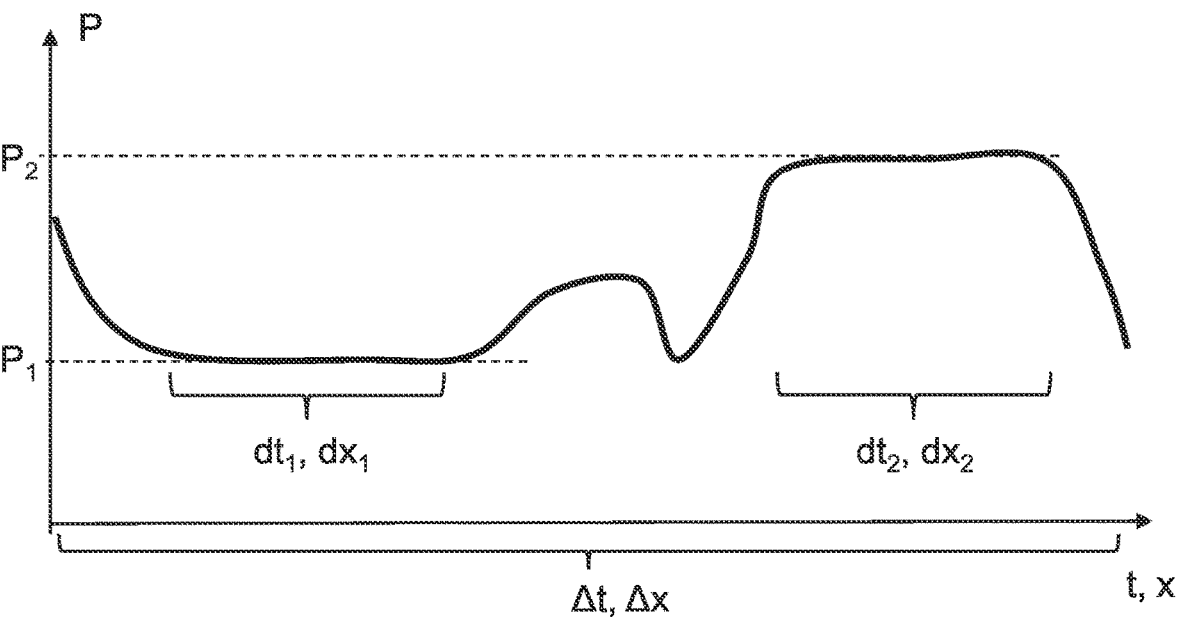
FIG. 4 is a diagram illustrating fuel cell operating power as a function of time/distance.

FIG. 3 illustrates a method for determining aging of a fuel cell system 1 according to an example embodiment of the invention. Reference is also made to FIG. 4, illustrating fuel cell operating power P as a function of time t and/or distance x.

In a first step S1, a future time interval $dt_1$, $dt_2$ or distance interval $dx_1$, $dx_2$ during which the fuel cell system 1 is expected to operate at stationary operating conditions, is identified during operation of the vehicle, i.e., during driving of the vehicle. Thus, the future interval may be identified either in terms of time t or distance x. The future interval may be a time interval $dt_1$, $dt_2$ or distance interval $dx_1$, $dx_2$ during which the fuel cell system 1 is expected to be operated or possible to operate at a constant or nearly constant operating power P, preferably within a linear power range of the fuel cell system 1. This is in FIG. 4 illustrated as a first interval $dt_1$, $dx_1$, and a second interval $dt_2$, $dx_2$, during which the fuel cell system 1 is expected to be operated at a nearly constant operating power $P_1$ in the low power operating range L and $P_2$ in the high power operating range H, respectively. The future time interval $dt_1$, $dt_2$ or distance interval $dx_1$, $dx_2$ may preferably be a time period or distance corresponding to at least a predetermined duration, such as at least two minutes, five minutes, or ten minutes. Thus, to be identified as a suitable future interval $dt_1$, $dt_2$, $dx_1$, $dx_2$, the fuel cell system 1 should be expected to operate at stationary operating conditions throughout the predetermined duration. When a future interval is identified in terms of distance, the duration is determined from an expected vehicle speed.

The first step S1 of identifying the future time interval $dt_1$, $dt_2$ or distance interval $dx_1$, $dx_2$ may typically comprise determining an expected travelling route of the vehicle 100, either by identifying that the vehicle is travelling along a known route, previously travelled, or by using data from a route planner or similar.

The first step S1 may comprise using machine learning based on historical data relating to the operating power P of the fuel cell system 1 to identify the future time interval $dt_1$, $dt_2$ or distance interval $dx_1$, $dx_2$. The historical data may be indicative of the operating power P of the fuel cell system 1 as a function of at least geographical location of the vehicle 100 and/or time. For example, the vehicle 100 may regularly travel a certain route. The historical data may in this case comprise data indicative of the operating power P of the fuel cell system 1 at one or more previous occasions of travelling along the expected travelling route.

The step S1 of identifying the future time interval $dt_1$, $dt_2$ or distance interval $dx_1$, $dx_2$ may additionally or alternatively comprise predicting the operating power P of the fuel cell system 1 during a prediction horizon $\Delta t$, $\Delta x$, as illustrated in FIG. 4. The step of identifying the future time interval $dt_1$, $dt_2$ or distance interval $dx_1$, $dx_2$ may in this case comprise determining the expected travelling route of the vehicle, and further receiving vehicle related information comprising at least one of traffic information for an expected travelling route of the vehicle 100 during the prediction horizon $\Delta t$, $\Delta x$, terrain information for the expected travelling route, topographic information for the expected travelling route during the prediction horizon $\Delta t$, $\Delta x$, weather information for the expected travelling route during the prediction horizon $\Delta t$, $\Delta x$, vehicle gross weight information, etc. The step S1 in this case further comprises using said received vehicle related information for predicting the future operating power P over the prediction horizon $\Delta t$, $\Delta x$. Battery information indicative of at least one of a current state-of-charge and an energy capacity of the electrical energy storage unit 2 during the prediction horizon $\Delta t$, $\Delta x$ may also be taken into account for predicting the operating power P during the prediction horizon $\Delta t$, $\Delta x$.

A combination of machine learning based on historical data and prediction based on e.g. traffic information and weather information may be used for identifying the future time interval $dt_1$, $dt_2$ or distance interval $dx_1$, $dx_2$.

In a second step S2, measurement values pertaining to at least one fuel cell parameter indicative of degradation of the fuel cell system 1 are obtained during the identified time interval $dt_1$, $dt_2$ or distance interval $dx_1$, $dx_2$. The at least one fuel cell parameter may be one or more of current, voltage, power, impedance, and efficiency, depending on which method is used for characterizing fuel cell aging.

Purely by way of example, polarization curves can be used for characterizing aging, in which case fuel cell voltage and current need to be measured. Such measurements may, e.g., be performed using a DC/DC converter of the power system 10. With increasing age, the polarization cell voltage as a function of current decreases. Another way of determining fuel cell aging is by using impedance spectra. Recording of such a spectrum requires pulsing of the fuel cell voltage and a simultaneous measurement of the current response. Yet another method that may be used for characterizing aging is to record efficiency curves by measuring the fuel cell system power P and divide by the actual power provided by the fuel, such as by a hydrogen fuel flow. The efficiency 11 of the fuel cell system 1 decreases with increasing age as illustrated in FIG. 2.

In a third, optional, step S3, actual operating conditions and/or an actual operating power of the fuel cell system 1 during the identified time interval $dt_1$, $dt_2$ or distance interval $dx_1$, $dx_2$ is/are detected. The operating conditions and/or the operating power P is/are in this case monitored during the course of the identified time interval $dt_1$, $dt_2$ or distance interval $dx_1$, $dx_2$.

In a fourth step S4, an aging state of the fuel cell system 1 is determined, using the measurement values obtained in step S2. When step S3 has been carried out, the step S4 may be performed in response to determining that the actual operating conditions and/or the actual operating power fulfill(s) at least one predetermined stability criterion, such as the operating power being within a predefined tolerance range for at least a predetermined time. If the stability criterion(s) is/are not fulfilled, step S4 may be omitted and the method restarts by trying to identify a future time interval $dt_1$, $dt_2$ or distance interval $dx_1$, $dx_2$ during which the fuel cell system 1 is expected to operate at stationary operating conditions.

The fourth step S4 may be performed using any of the methods described above in connection with the second step S2. Thus, a degradation model is typically used, describing the aging state of the fuel cell system 1. The measured fuel cell parameter(s) is/are used as input to the degradation model describing the aging state of the fuel cell system 1. In this way, the degradation model can be updated on each occasion the fuel cell system 1 is operated at stationary operating conditions during a sufficiently long time period.

The method illustrated in FIG. 3 may also comprise an optional fifth step S5 of determining a reliability of the determined aging state, wherein the reliability is determined in dependence on at least a number of measurement occasions in each one of the predetermined low power operating range L, the predetermined medium power operating range M, and a predetermined high power operating range H of the fuel cell system 1, such as a number of measurement occasions within a predetermined time frame or mileage frame of the vehicle 100.

Figure 5:
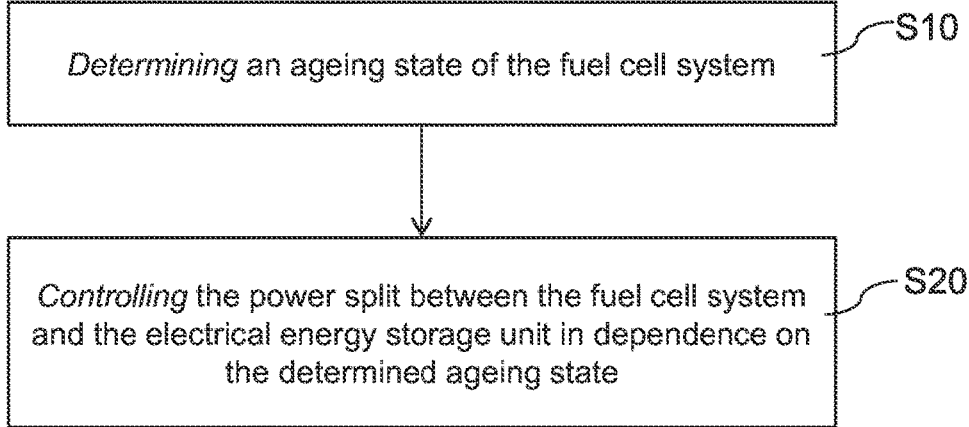
FIG. 5 is a flow chart illustrating an embodiment of a method for controlling power split between a fuel cell system and an electrical energy storage unit.

FIG. 5 illustrates a method for controlling power split between a fuel cell system and an electrical energy storage unit to which the fuel cell system is electrically connected, such as the fuel cell system 1 and the electrical energy storage unit 2 illustrated in FIG. 1. The method comprises a first step S10 of determining an aging state of the fuel cell system 1 by using the method illustrated with reference to FIG. 3. It further comprises a second step S20 of controlling the power split between the fuel cell system 1 and the electrical energy storage unit 2 in dependence on the determined aging state of the fuel cell system 1. Preferably, an aging state of the electrical energy storage unit 2 may also be taken into account.

It is to be understood that the present invention is not limited to the embodiments described above and illustrated in the drawings; rather, the skilled person will recognize that many changes and modifications may be made within the scope of the appended claims.

The invention claimed is:

1. A method for determining aging of a fuel cell system for a vehicle, comprising:
   during operation of the vehicle, identifying a future interval in terms of time or distance, during which interval the fuel cell system is expected to operate at stationary operating conditions, and during which interval the fuel cell system is expected to be operated at a constant or nearly constant operating power,
   obtaining measurement values pertaining to at least one fuel cell parameter indicative of degradation of the fuel cell system during the identified interval only, and determining an aging state of the fuel cell system using the measurement values.

2. The method of claim 1, wherein the constant operating power is within a linear power range of the fuel cell system.

3. The method of claim 1, further comprising:
   determining a reliability of the determined aging state, wherein the reliability is determined in dependence on at least a number of measurement occasions in each one of a predetermined low power operating range, a predetermined medium power operating range, and a predetermined high power operating range of the fuel cell system.

4. The method of claim 1, wherein identifying the future interval comprises predicting an operating power of the fuel cell system during a prediction horizon.

5. The method of claim 4, wherein predicting the operating power comprises:
   receiving vehicle related information comprising at least one of traffic information for an expected travelling route of the vehicle during the prediction horizon, terrain information for the expected travelling route during the prediction horizon, topographic information for the expected travelling route during the prediction horizon, weather information for the expected travelling route during the prediction horizon, and vehicle gross weight information during the prediction horizon, and
   using the received vehicle related information for predicting the operating power during the prediction horizon.

6. The method of claim 1, wherein identifying the future interval comprises using machine learning based on historical data relating to an operating power of the fuel cell system.

7. The method of claim 6, wherein the historical data comprises data indicative of the operating power of the fuel cell system as a function of at least geographical location of the vehicle and/or time.

8. The method of claim 6, wherein identifying the future interval comprises determining an expected travelling route of the vehicle, and wherein the historical data comprise data indicative of the operating power of the fuel cell system at one or more previous occasions of travelling along the expected travelling route.

9. The method of claim 1, wherein the future interval has a duration or length corresponding to at least two minutes.

10. The method of claim 1, further comprising:
    detecting actual operating conditions and/or an actual operating power of the fuel cell system during the identified interval,
    wherein the determination of the aging state of the fuel cell system using the measured at least one fuel cell parameter is only carried out when the actual operating conditions and/or the actual operating power fulfill(s) at least one predetermined stability criterion.

11. The method of claim 1, wherein determining the aging state comprises inputting the measured at least one fuel cell parameter to a degradation model describing the aging state of the fuel cell system.

12. A method for controlling power split between a fuel cell system and an electrical energy storage unit to which the fuel cell system is electrically connected, comprising:
    determining an aging state of the fuel cell system using the method of claim 1, and
    controlling the power split between the fuel cell system and the electrical energy storage unit in dependence on the determined aging state of the fuel cell system.

13. A computer program comprising program code means for performing the method of claim 1 when the computer program is run on a computer.

14. A computer readable medium carrying a computer program comprising program code means for performing the method of claim 1 when the computer program is run on a computer.

15. A control unit comprising processing circuitry configured to perform the method of claim 1.

16. A vehicle comprising a fuel cell system adapted to deliver power contributing to the propulsion of the vehicle and the control unit of claim 15.

*   *   *   *   *